(12) United States Patent
Hernot

(10) Patent No.: US 9,159,181 B2
(45) Date of Patent: Oct. 13, 2015

(54) METHOD AND SYSTEM FOR AUTOMATICALLY DEPOSITING OBJECTS FOR THE PURPOSE OF THEIR TRANSPORTATION

(75) Inventor: Alexis Hernot, Paris (FR)

(73) Assignee: IER, Suresnes (FR)

( * ) Notice: Subject to any disclaimer, the term of this patent is extended or adjusted under 35 U.S.C. 154(b) by 172 days.

(21) Appl. No.: 12/935,937

(22) PCT Filed: Apr. 3, 2009

(86) PCT No.: PCT/FR2009/050570
§ 371 (c)(1),
(2), (4) Date: Dec. 27, 2010

(87) PCT Pub. No.: WO2009/136040
PCT Pub. Date: Nov. 12, 2009

(65) Prior Publication Data
US 2012/0022684 A1    Jan. 26, 2012

(30) Foreign Application Priority Data

Apr. 4, 2008 (FR) .................................. 08 52282

(51) Int. Cl.
| | |
|---|---|
| G06K 7/00 | (2006.01) |
| G07F 7/06 | (2006.01) |
| B64F 1/36 | (2006.01) |
| G06Q 10/08 | (2012.01) |

(52) U.S. Cl.
CPC .............. *G07F 7/0636* (2013.01); *B64F 1/368* (2013.01); *G06Q 10/08* (2013.01)

(58) Field of Classification Search
CPC ...................................................... B64F 1/368

USPC ........................................ 700/225; 340/572.1
See application file for complete search history.

(56) References Cited

U.S. PATENT DOCUMENTS

| | | | | |
|---|---|---|---|---|
| 6,108,636 | A * | 8/2000 | Yap et al. ........................... | 705/5 |
| 6,476,718 | B1 * | 11/2002 | Cartwright et al. ......... | 340/572.1 |
| 6,507,279 | B2 * | 1/2003 | Loof .......................... | 340/572.1 |

(Continued)

FOREIGN PATENT DOCUMENTS

| | | | | |
|---|---|---|---|---|
| JP | 2005/289634 | * | 10/2005 | ............. B65G 61/00 |
| JP | 2005289634 | * | 10/2005 | ............. B65G 61/00 |

(Continued)

*Primary Examiner* — Gene Crawford
*Assistant Examiner* — Thomas Randazzo
(74) *Attorney, Agent, or Firm* — Greer, Burns & Crain, Ltd.

(57) ABSTRACT

A method for automatically depositing objects for transport, including a phase of user storing transport data in a storage element, the data relating to: the user associated with the object; the total number of objects declared by the user; the destination, the route and the time of the transport; a depositing phase, including: a user applying a first electromagnetic identification tag onto an object to be transported; placing, by the user, the object to be transported on a conveyance device; reading an identification data, by first reading device, from the first electromagnetic identification tag, storing identification data read in the storage element in association with previously stored transport data; a phase of conveying the object for transport; the depositing phase including a measurement of the weight and/or dimensions of the object and/or storing, in the storage element, of the weight and/or the dimensions in association with the transport data.

19 Claims, 6 Drawing Sheets

(56) References Cited

U.S. PATENT DOCUMENTS

| | | | |
|---|---|---|---|
| 6,662,078 B1* | 12/2003 | Hardgrave et al. | 700/226 |
| 6,698,653 B1* | 3/2004 | Diamond et al. | 235/375 |
| 6,967,579 B1 | 11/2005 | Elizondo | |
| 7,126,470 B2* | 10/2006 | Clift et al. | 340/539.13 |
| 7,369,050 B1 | 5/2008 | De Gennaro et al. | 340/572.1 |
| 7,522,053 B2* | 4/2009 | Johnson et al. | 340/572.1 |
| 7,564,349 B2* | 7/2009 | Robey | 340/540 |
| 7,570,165 B2* | 8/2009 | Abraham et al. | 340/572.1 |
| 7,656,273 B2* | 2/2010 | Ehrman et al. | 340/10.1 |
| 7,845,569 B1* | 12/2010 | Warther et al. | 235/492 |
| 7,860,604 B2* | 12/2010 | Frankel | 700/236 |
| 2003/0189094 A1* | 10/2003 | Trabitz | 235/385 |
| 2003/0216969 A1* | 11/2003 | Bauer et al. | 705/22 |
| 2005/0036620 A1* | 2/2005 | Casden et al. | 380/259 |
| 2005/0051622 A1 | 3/2005 | Mak | |
| 2006/0022030 A1* | 2/2006 | Boothroyd | 235/375 |
| 2006/0232398 A1* | 10/2006 | Nedblake et al. | 340/539.13 |
| 2007/0069897 A1* | 3/2007 | Bauchot et al. | 340/572.1 |
| 2008/0055084 A1* | 3/2008 | Bodin et al. | 340/572.1 |
| 2009/0064101 A1* | 3/2009 | Boss et al. | 717/113 |
| 2009/0295544 A1* | 12/2009 | Bayer et al. | 340/10.1 |
| 2009/0307529 A1* | 12/2009 | Kim | 714/37 |
| 2010/0018839 A1* | 1/2010 | Tan | 198/507 |

FOREIGN PATENT DOCUMENTS

| | | |
|---|---|---|
| WO | WO 02/15115 A1 | 2/2002 |
| WO | WO 2007/120266 A2 | 10/2007 |

* cited by examiner

METHOD AND SYSTEM FOR AUTOMATICALLY DEPOSITING OBJECTS FOR THE PURPOSE OF THEIR TRANSPORTATION

BACKGROUND

The present invention relates to a method for automatically depositing objects for transporting the objects. It also relates to a system implementing this method.

The invention relates more particularly to a method and a system capable for example of implementation at places such as airports for the deposit of baggage items by an air transport passenger for the purpose of the transport of the baggage items in an aircraft hold, or places such as post offices for depositing packages to be transported by a postal organization.

The current procedure for depositing a baggage item at airports is carried out:
  at a check-in desk where an agent weighs a baggage item and enters its deposit into the data associated with the passenger (PNR), or
  at a desk for depositing baggage items where the passenger goes after completing his check-in and having printed, or not, a luggage label on paper media, containing a barcode. Such a desk is also attended by at least one agent.

In both cases, an agent inspects the boarding card of the passenger and the number of baggage items deposited and updates the centralized information system of the airline.

This means that the airline must employ a sufficient number of agents in order to attend to the deposit of baggage. This involves a cost for the airline as well as a reduction in customer service. In fact, in many cases the agent performs additional tasks: seat changes, discussion with the passenger, information. These tasks take up time, reduce the efficiency of the agent and result in queues.

Moreover, in most cases, depositing the baggage is carried out at desks which are dedicated to a specific route only. Thus, the number of agents increases according to the number of routes, especially when the departure times of the different routes are close together and the baggage items for several routes must be deposited at the same time.

SUMMARY

A purpose of the present invention is to overcome the above mentioned drawbacks.

A further purpose of the invention is to propose a method and a system making it possible to carry out the depositing of objects with fewer agents and a higher quality of service.

Finally, a further purpose of the invention is to propose a method and a system for depositing objects, capable of use at the same time by several companies for several routes, while reducing the time and space for depositing objects.

The invention proposes to achieve the above-mentioned purposes by a method for automatically depositing objects for the purpose of the transport of said objects, said method comprising:
  a depositing phase or step, comprising the following steps:
    applying, by a user, a first electromagnetic identification label onto an object to be transported,
    placing, by said user, said object to be transported on means of conveyance,
    reading an identification data, by a first reading means, from said first electromagnetic identification tag, and
    storing said identification data read in storage means in association with previously stored data relating to said transport;
  a conveying phase or step for conveying said object for the purpose of its transport.

According to the invention, the objects to be transported are either baggage items to be transported when the invention is applied to automatically depositing baggage items at places such as airports, or packages when the invention is applied to automatically depositing packages at places such as post offices or similar.

Hereinafter, "user" denotes a traveller when the invention is applied to automatically depositing baggage items at places such as airports, or a client of a postal organization when the invention is applied to automatically depositing packages at places such as post offices or similar.

The first identification tag, which is an electromagnetic tag, can be associated with the user, such as for example an RFID tag with a number of a user or frequent traveller.

The first electromagnetic tag can be an identification tag of the RFID (Radio Frequency Identification) type, optionally reusable. The risk of incorrect routing of baggage is thus reduced, as the passenger applies an RFID identification tag, for example a permanent tag, that is more robust and easier to read than the paper label with a barcode currently provided. This results in a substantial reduction in distribution of incorrectly routed baggage items by the airlines and an improvement in customer service.

The method according to the invention makes it possible to dispense with agents for carrying out the depositing phase, during which the object is deposited by the user. The airline or postal organization can thus economize on the salary of the agent present at the location of deposit of objects to be transported.

Moreover, using the method according to the invention, depositing objects for several routes can be carried out at the same time. It is not necessary to provide additional personnel as the users will deposit their baggage items themselves.

For the users, the advantage lies in a significant reduction in the deposit time for objects as queues are avoided: each user spends much less time depositing his object(s) and scalability of systems for depositing objects is facilitated as management of personnel is not required.

For the airport or the post office, the method according to the invention represents a much more efficient use of space, as a space identical to one counter can allow a greater number of users to deposit objects (baggage items or packages). This advantage is even more significant as the system is capable of use in parallel by several companies responsible for transport, which is rarely the case at present.

According to a particular version of the invention, the method according to the invention can comprise, before the phase of conveying said object for the purpose of its transport:
  a phase of conveying said object to second reading means; and
  a processing phase or step, performed out of reach of said user and comprising the following steps:
    automatic reading of the identification data from the first electromagnetic identification tag, by said second reading means,
    writing, on a second identification tag, at least a part of the data relating to said transport associated with said read identification data, and
    applying said second identification tag onto said object.

Thus, using the method according to the invention, only an unqualified agent is required in order to apply the second identification tag. This second phase can be carried out outside the area that is accessible to the passengers and out of their sight.

Advantageously, the second identification tag can be either an electromagnetic tag, for example RFID, or a barcode label or also a combination of the two. When this second identification tag is an RFID tag, it can be used by the airline or postal organization for other applications for the handling of baggage items or packages using RF (Radiofrequency), such as for example the sorting of baggage items or packages.

The method according to the invention comprises moreover a prior phase of storing the data relating to the transport in storage means, said data comprising:
  data relating to the user with whom the object is associated,
  data relating to the total number of objects (306) declared by said user, and/or
  data relating to the destination, the route and the time of the transport.

The advantages of the method according to the invention are increased when the user registers in advance, for example on a terminal provided for this purpose, over the internet or by telephone.

Thus the method according to the invention can comprise an identification of the user with whom the baggage items or packages to be transported are associated, during the depositing phase, before the automatic reading of the first identification tag by the first reading means. The user who has registered in advance is identified by means of an identity document, a secret code or other, and can thus begin to deposit his baggage items or packages onto which he has applied a first electromagnetic identification tag.

The depositing phase can advantageously comprise a measurement of the weight and/or the dimensions of the baggage item and/or storing in storage means of said weight and/or said dimensions in association with the data relating to the transport. This measurement can in particular take place during the reading of the first identification tag by the first reading means. Thus, the weight of the baggage item or package can be checked. If the weight is greater than a maximum weight, the method according to the invention can comprise a display on display means of a notice inviting the passenger or the user to pay a sum of money for the excess weight. The payment can take place either directly in the depositing area, for example using a credit card, or at a desk located in the airport or the post office close to the depositing area.

Advantageously, the storage means can be accessible via an information system of a company responsible for the transport. The storage means can also form part of such a system which can communicate with:
  the first and/or the second reading means,
  the writing means, and
  optionally, the means of conveyance;
and which can carry out the control of these different means and the management of the exchanges of data between these means.

According to an advantageous feature of the method according to the invention, the depositing phase can comprise a step of taking or reading a biometric data of the user, i.e. the passenger, for example taking a fingerprint, iris imprint, a facial photo. The same biometric data is read or taken during the boarding phase. The biometric data provided during the boarding phase is then compared to the one provided during the depositing phase. This comparison allows a very reliable reconciliation between the person who has deposited a baggage item and the person boarding the flight.

In a particular embodiment, the method according to the invention can be implemented for automatically depositing baggage items at an airport for one or more travel companies.

In another particular embodiment, the method according to the invention can be implemented for automatically depositing packages at a place such as a post office or similar.

According to another aspect of the invention, there is proposed a system for automatically depositing objects for the purpose of the transport of said objects, said system comprising:
  first means of reading an identification data from a first electromagnetic identification tag applied by a user onto an object to be transported,
  storage means, communicating with said first reading means, provided for storing said identification data in association with previously stored data relating to said transport, and
  means of conveyance provided for conveying said object deposited by said user on said means of conveyance, for the purpose of the transport of said object.

Advantageously, the system according to the invention can moreover comprise:
  means of conveying the object, from the first reading means to second reading means,
  second means of reading the identification data from the first identification tag, said second reading means being arranged out of reach of the user, and
  means of writing, on a second identification tag, data relating to said transport associated with said identification data read by said second reading means, said second identification tag being provided in order to be applied onto said object.

The writing means can be printing means, in particular printers, advantageously arranged approximately at the level of the second reading means. When the second identification tag is an electromagnetic tag, and more particularly an RFID tag, the writing means can comprise at least one electromagnetic or RFID antenna provided in order to write data into the second RFID tag.

The different means of which the system is composed can communicate with each other and with a centralized information system by means of the use of a management module, which moreover communicates with the centralized information system. Such a module can carry out the control of at least a part of the different means of which the system is composed.

In a particular embodiment, the different means of which the system according to the invention is composed can communicate, at least indirectly, with the centralized information system of the company responsible for the transport which can carry out the control of all or part of these means.

Advantageously, the system according to the invention can moreover comprise means of measuring the weight and/or the dimensions of the object, incorporated into the means of conveying the objects at the level of the first reading means.

In a particular embodiment, the means of conveyance comprise at least one conveyor. The first and the second reading means comprise RFID antennas, arranged on the path of conveyance of the objects. The first reading means are arranged upstream of the second reading means, with respect to the direction of conveyance of the objects.

In a particular embodiment, the RFID antennas can be arranged on mobile supports, flexible or not, arranged substantially perpendicular to the direction of passage of the objects and which:
  when idle form a barrier or curtain with respect to the direction of passage of the objects, and, on contact with the objects move to a retracted position in order to allow the objects to pass.

According to another particular embodiment, the RFID antennas can also be arranged on a portal that the objects pass through during their conveyance. The system according to the invention comprises at least one first portal on which the first reading means are arranged and, optionally, a second portal on which the second reading means are arranged.

The storage means can communicate with a centralized information system of a company responsible for the transport, i.e. an airline or a postal organization.

The writing means communicate with the second reading means, or the storage means, or both, or also with the centralized information system of the company responsible for the transport. The data to be written are sent to the writing means by the second reading means or the storage means or also by the centralized information system of the company responsible for the transport of the objects.

The system according to the invention can be implemented for automatically depositing baggage items at an airport for the purpose of the air transport of said baggage items or for automatically depositing packages at a post office for the purpose of the transport of said packages.

The system according to the invention can moreover comprise means of reading or taking a biometric data of the user, i.e. the passenger, at the time of depositing baggage items, for example means for taking fingerprints, iris imprints, a facial photo. The installation can comprise in this case means for storing the biometric data taken or read at the time of depositing baggage items in relation to identification data of the user and/or data relating to the baggage items deposited by said user. The system according to the invention can then also comprise means of reading or taking the same biometric data at the time of boarding, and means of comparison of the data taken or read at the time of boarding with the data taken or read at the time of deposit. These means allow a very reliable reconciliation between the person who has deposited a baggage item and the person boarding the flight.

According to another aspect of the invention, there is proposed an installation for automatically depositing objects for the purpose of the transport of said objects, said installation comprising:
  a plurality of first reader modules, each comprising first means of reading an identification data from a first electromagnetic identification tag applied by a user onto an object to be transported,
  storage means, communicating with each of said first reader modules, and provided for storing identification data read by said first reader modules, and
  means of conveying said object deposited by said user onto said means of conveyance, for the transport of said object.

Advantageously, the installation according to the invention can moreover comprise:
  means of conveying the baggage items from the first reader modules to at least one second reader module,
  at least one second reader module comprising second means of reading the identification data from the first electromagnetic identification tag,
  at least one module for writing, on a second identification tag, data relating to said transport associated with said identification data read by said second reading means, said second identification tag being provided in order to be applied onto said object.

DETAILED DESCRIPTION

Figure 1:
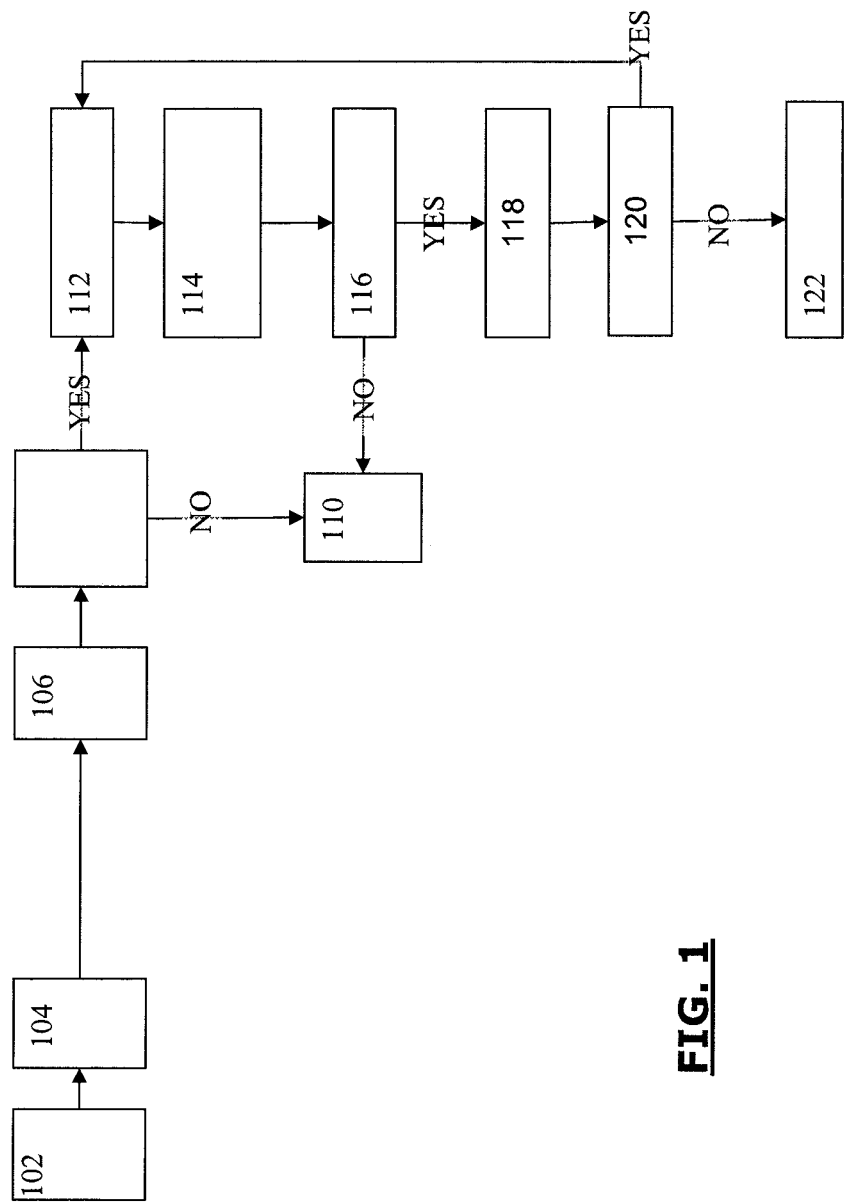
FIG. 1 is a flowchart showing an example of the sequence of different operations during a depositing phase of a particular version of the method according to the invention implemented for automatically depositing baggage items.

FIG. 1 shows an example of the progress of the different steps during a depositing phase of a method according to the invention in which a passenger has deposited one or more baggage items.

During step 102, the passenger registers on a flight and declares the number of baggage items that he wishes to check in. This first step 102 can be carried out in the airport but also remotely, for example during a booking on the website of a travel company, this booking capable for example of being carried out at home or in the office. This step 102 is very important in terms of security, as it makes it possible to verify that a malicious person does not deposit baggage items in place of the passenger. In fact, boarding cards can be printed on normal paper at home, in the office, etc. Thus, there is an easy opportunity for this boarding card to be duplicated. A malicious person, having retrieved a boarding card, could attend in order to deposit a baggage item in place of a passenger. If the genuine passenger has already deposited his baggage, the system will reject this and request the passenger to go to a manual desk in order to verify his identity. If the malicious person has deposited his baggage first, the genuine passenger is blocked and must then go to a desk. After having proved his identity, for example by means of a secret code, the first baggage deposited by the malicious person can be removed and that of the passenger accepted.

Similarly, a passenger who indicated no baggage items at registration but who has changed his mind must go to a manual desk.

Advantageously, the passenger can also register by using a biometric identity document.

After registering and declaring the number of baggage items to be deposited, the passenger attaches a radio frequency (RFID) tag to his baggage in step 104. This tag can be a tag that is reusable on several flights.

At the airport, during step 106, the passenger is identified on a system for automatically depositing baggage items according to the invention by presenting for example his boarding card, inserting his frequent traveller card, giving his name, presenting the biometric identity document used for the registration during step 102. In order to carry out this identification, the system according to the invention can comprise means of reading an identity document, optionally biometric, communicating with the information system of the airline. The system can comprise means of measuring biometric characteristics of the passenger in order to validate the identity of the passenger.

After verification of the identity of the passenger, in step 108, the system according to the invention communicates with the information system of the airline in order to verifier if the passenger is authorized to deposit baggage items.

If the passenger is not authorized to deposit one or more baggage items, the system invites the passenger to go to a desk attended by an agent in step 110.

If the passenger is authorized to deposit one or more baggage items, in step 112 the system invites the passenger to place his first baggage item on the means of conveying the baggage item, for example a conveyor, to the first means of reading the RFID tag, namely one or more radiofrequency antennas, for example arranged at the level of a RF reader portal.

In step 114, the conveyor conveys the baggage item under the RF reader portal. The tag is read by the RF antennas and system and the number of the tag is added to the items of passenger information (PNR) which are stored in the information system of the airline.

If the airline has chosen the "weigh" option, a scale is incorporated into the conveyor at the location where the RF portal is placed. The weight of the baggage item is measured in step 116 and the result of the weighing is added to the PNR together with the number of the RFID tag. The system according to the invention is designed so that the passenger cannot reach his baggage item when it is under the RF tunnel. This means that he cannot falsify the weighing.

If the weight of the baggage item is greater than a limit set by the company, then the system invites the passenger to go to a desk in order to pay the amount covering the excess weight. The system according to the invention can also comprise means for paying this amount on site using automatic payment means, for example by bank card or in cash.

The system comprises moreover means for display and alerting the passenger to the different steps of depositing baggage items. Thus, a green warning light shows if the PNR is correctly updated.

In step 118, the conveyor conveys the baggage item to the second means of reading the RFID tag.

In step 120, the system queries the passenger or the information system, in order to determine if another baggage item is to be deposited. If affirmative, the system invites the passenger to deposit the next baggage item, and steps 112 to 120 are repeated for each of the baggage items. Otherwise, a receipt showing the passenger that his baggage item(s) has (have) been registered is issued in step 122 and another passenger can then deposit his baggage items.

Figure 2:
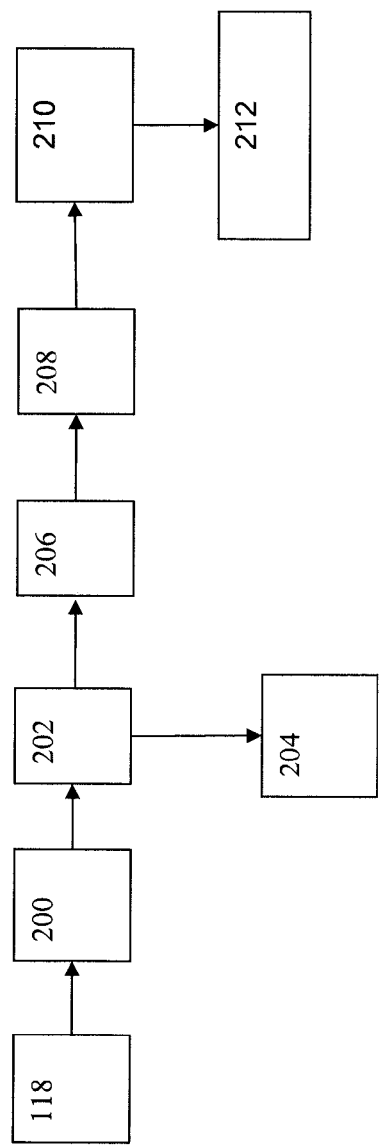
FIG. 2 is a flowchart showing an example of the sequence of different steps during a second phase of a particular version of the method according to the invention implemented for automatically depositing baggage items.

FIG. 2 shows an example of the progress of the different steps during a second phase of a method according to the invention during which the baggage items deposited by a passenger are processed by an unqualified agent.

In step 118, the baggage item is conveyed by the conveyor from the first means of reading the RFID tag to the second means of reading the RFID tag. These second reading means can comprise a portal including one or more antennas and through which the baggage items are conveyed by the conveyor.

In step 200, the number of the RFID tag is read by the second reading means and sent to the centralized information system of the airline.

In step 202, the centralized information system of the company determines if the baggage item has been identified. To this end the centralized information system consults the storage means in which the numbers of the RFID tags read by the first reading means are stored.

If the baggage item is not identified by the centralized information system of the company then the baggage item is conveyed, in step 204, to a service for managing unidentified baggage items.

If the baggage item is identified by the information system, i.e. if the number of the tag is recognized by the centralized information system, the items of information concerning the journey and the passenger which are stored in the storage means, in particular during step 102, and which are to be printed on the paper luggage label, are sent to printing means during step 206.

During step 208, the printing means print the received items of information onto a standard luggage label, for example IATA standard with a barcode.

An agent then collects the printed luggage label and places it on the baggage item that is undergoing processing during step 210.

After placing the label on the baggage item, the agent causes the forward movement of the baggage item, which then passes into a standard sorting procedure in step 212. The processed baggage item passes into the baggage sorting system and the following baggage item is then processed according to steps 200-212, which initiates the printing of the associated label.

Figure 3:
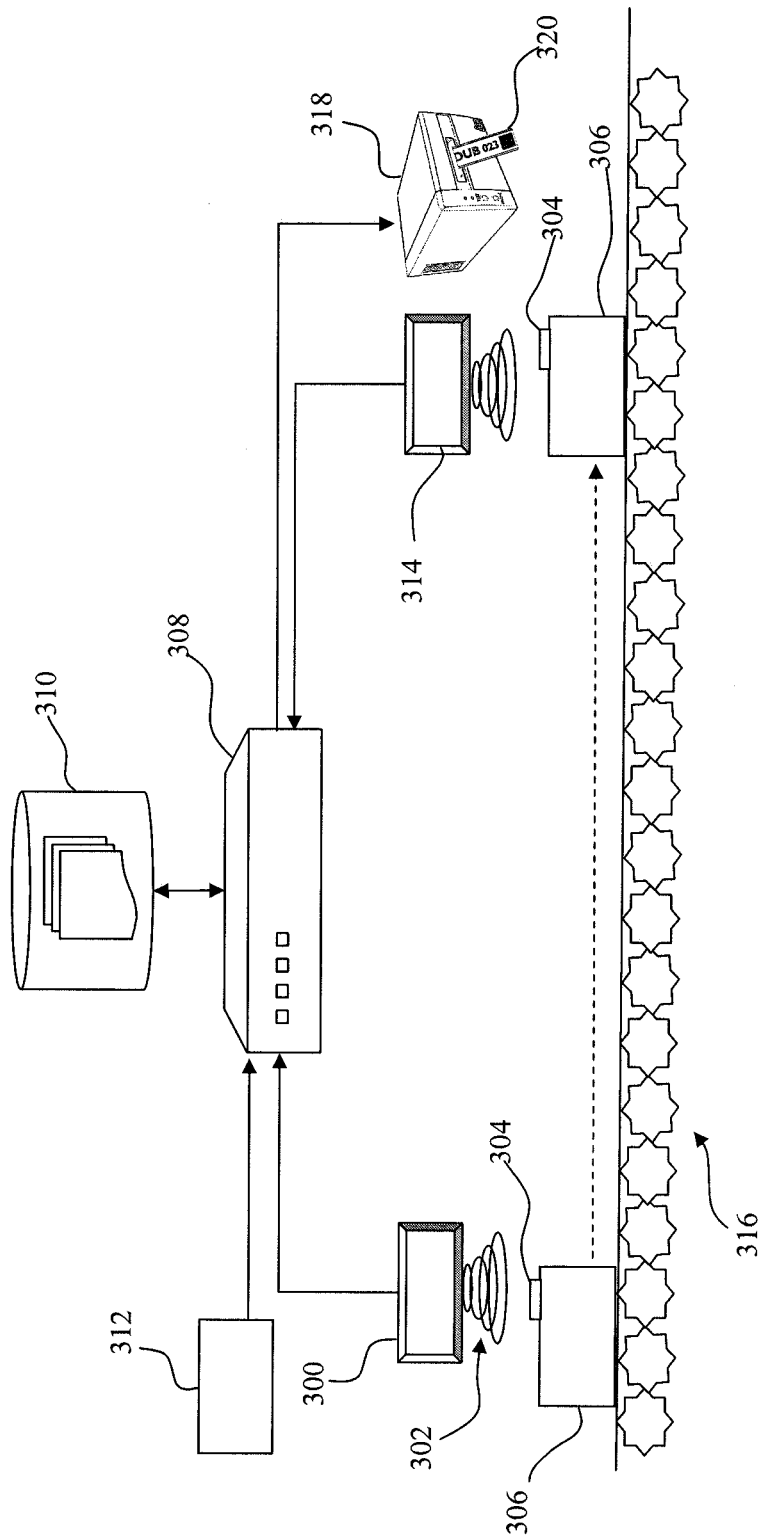
FIG. 3 is a diagrammatic representation of an example of a system according to the invention implemented for automatically depositing baggage items.

FIG. 3 is a very diagrammatic representation of a system according to the invention. The system according to the invention comprises first means 300 of reading, by radiofrequency waves 302, a radiofrequency tag 304 applied onto a baggage item 306. The first reading means communicate with the centralized information system 308 of the airline. The items of information read by the first reading means 300, and in particular the number of the RFID tag 304, are sent to the centralized information system 308 of the company. The centralized information system stores these items of information, in storage means 310, in association with the items of information relating to the passenger depositing the baggage item 306, previously identified using means of identification 312 communicating with the centralized information system 308.

The baggage item is then conveyed from the first reading means 300 to the second reading means 314 using means of conveyance 316. The second reading means 314 carry out the reading by radiofrequency waves 318, of the radiofrequency tag 304 of the baggage item 306. The read items of information, and in particular the number of the RFID tag 304, are sent to the centralized information system 308. The latter consults the storage means in order to determine if this baggage item is correctly identified and determines the passenger with whom this baggage item is associated. Then, the centralized information system 308 sends the items of information relating to the journey and to the passenger to the printing means 318. These printing means 318 print the items of information received onto a standard format paper luggage label 320 that an operator places on the baggage item 306.

Figure 4:
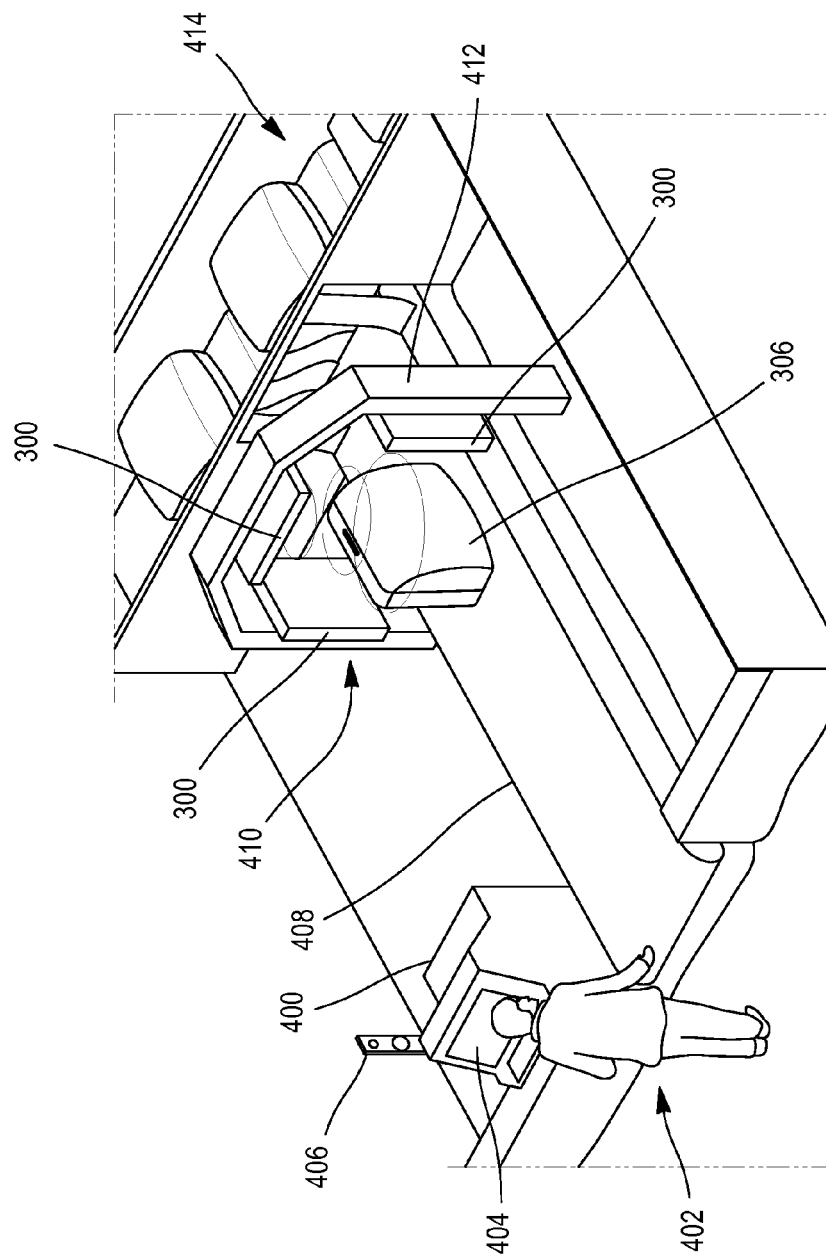
FIG. 4 is a diagrammatic representation of an example of a system according to the invention, implemented for automatically depositing baggage items, at the level of the first reading means.

FIG. 4 is a diagrammatic representation of an example of a system according to the invention at the level of the first reading means. As shown, the system according to the invention comprises an interactive module 400 arranged so that the user can be identified before depositing his baggage item(s). This interactive module also makes it possible to guide the user throughout the baggage deposit process and allows information to be provided to the user during the different steps. The module 400 comprises means 404 of displaying different items of information and indicator light means 406 making it possible to indicate to the user if the deposit of a baggage item has been validated or not.

The passenger 402 is identified using all identification means at the level of the interactive module 400. Once identified, the user places his baggage item 306, bearing an RFID tag, on the conveyor means, here a conveyor belt 408. This conveyor belt 408 conveys the baggage item to a first reader module 410 comprising a portal 412 including three series of radiofrequency antennas 300. The RFID tag is read by the radiofrequency antennas.

The system according to the invention comprises moreover, at the level of the portal, means for the measurement of the weight of the baggage item (not shown) carrying out a measurement of the weight of the baggage item 306. During the reading of the RFID tag and the measurement of the weight of the baggage item 306, the latter is out of reach of the passenger 402 so that the passenger 402 cannot falsify the weight of the baggage item 306.

If all the steps 102-122 described above are carried out successfully, a green indicator lights up at the level of the indicator means 406 in order to indicate to the passenger 402 that depositing the baggage item has taken place successfully. The baggage item is then conveyed by a conveyor 414 to the second reading means.

Moreover, the interactive module further comprises means of payment (not shown), for example by payment card or in cash, when the weight of the baggage item 306 is greater than a maximum weight and an additional payment is necessary.

Figure 5:
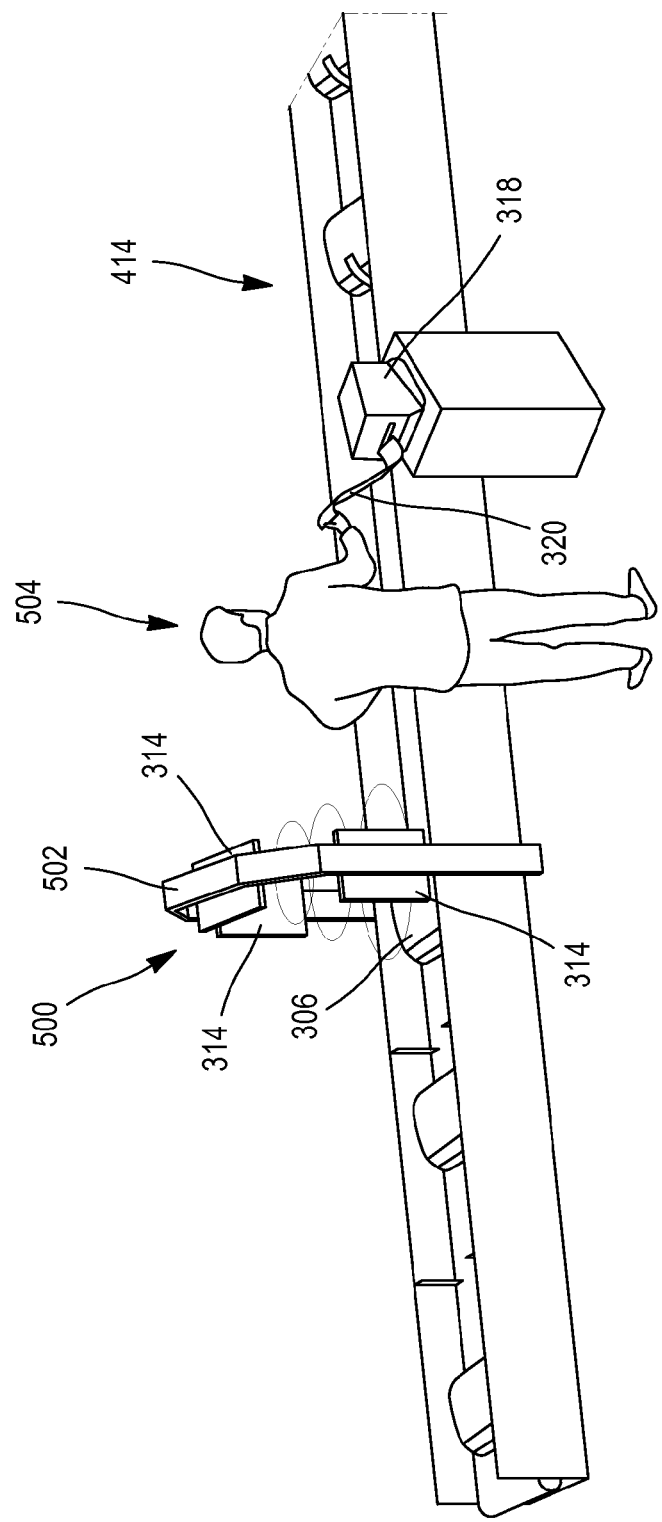
FIG. 5 is a diagrammatic representation of an example of a system according to the invention, implemented for automatically depositing baggage items, at the level of the second reading means.

FIG. 5 is a diagrammatic representation of an example of the system according to the invention at the level of the second reading means. As shown, the system according to the invention comprises, at the level of the second reading means, a second reader module 500 comprising a portal 502 including three series of RFID antennas 314. The baggage items deposited by the passengers are conveyed to this portal by the conveyor. The RFID tag of each of the baggage items is read by the radiofrequency antennas 314, and the information read are sent to the centralized information system of the company, which sends the items of information relating to the journey and the passenger to a printer 318 which prints these items of information onto a standard luggage label 320. An agent 504 places the luggage label 320 on the baggage item 306.

Figure 6:
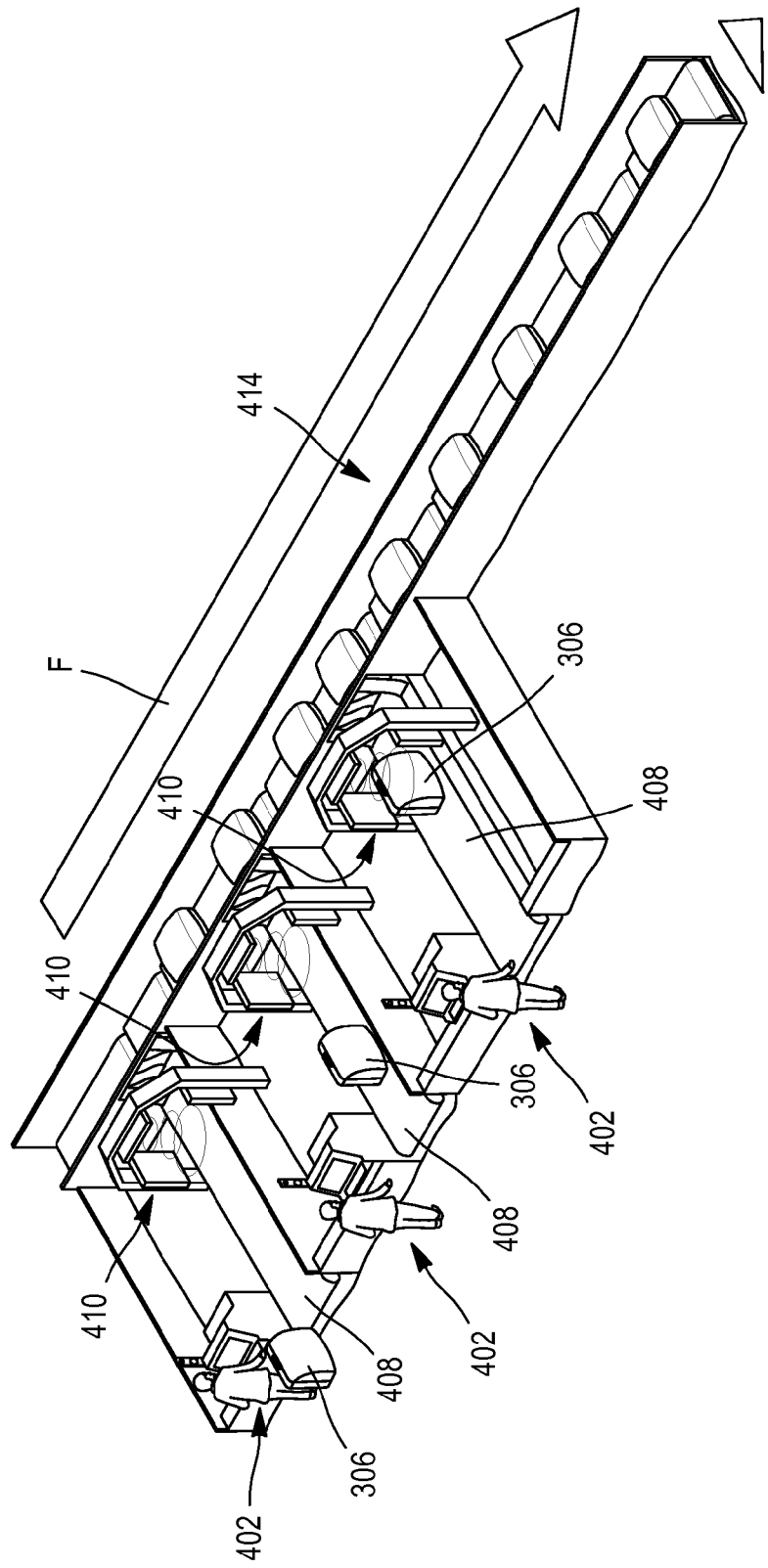
FIG. 6 is a diagrammatic representation of an installation according to the invention, implemented for automatically depositing baggage items, at the level of the first reader modules.

FIG. 6 is a diagrammatic representation of an installation according to the invention at the level of the first reading means. As shown in FIG. 6, the installation comprises 3 conveyors 408 defining a baggage item deposit line and discharging onto the conveyor 414. A first reader module, comprising a portal and radiofrequency antennas, is arranged on each of the conveyors 408. The users 402 place their baggage items on the conveyors 408. The radiofrequency tag attached to each of the baggage items 306 is read by the corresponding first reader module 410 and the baggage items are conveyed, by each of the conveyors 408, to the conveyor 414. The latter conveys the baggage items in the direction indicated by the arrow F to the second reader module, not shown in FIG. 6.

Moreover, according to the invention, at the time of depositing the baggage, the passenger can provide a biometric data, for example a one-finger or two-finger print, an iris imprint or a facial photo, which is associated with his registration in the centralized information system of the company for example. This biometric information can be temporary or permanent.

An alternative is enrollment of the passenger data in a storage medium, for example a card or passport, containing their biometric information. This storage medium must then be used as an identifier during the depositing of the baggage item. When boarding, the passenger provides the same biometric information as when depositing the baggage item. This information is compared to the items of information stored in the centralized information system. Advantageously, the biometric information is "live", and not limited to an item of information stored on a medium, for example in order to avoid the case of a stolen storage medium.

Of course, the invention is not limited to the examples that have just been described. It can be implemented for automatically depositing packages at a place such as a post office. Moreover, adjustments can be made to the invention as described above, without exceeding the scope of the invention.

The invention claimed is:

1. A method of preparing and attaching an identification tag to at least one object, the method comprising:
   obtaining, by a user, a first reusable electromagnetic identification tag including identification data that associates the first electromagnetic identification tag with the user;
   a prior phase of storing user data associated with said first electromagnetic identification tag in a data memory by a user, wherein the user is at a location that is remote from the transport place and remote from a location of the data memory, said user data comprising:
      information relating to the user with whom the at least one object is associated;
      information relating to the total number of objects declared by said user; and
      information relating to a destination, a route and a time of the transport of the at least one object;
   applying, by the user, said first electromagnetic identification tag to the at least one object to be transported;
   a depositing phase taking place at the transport place, said depositing phase comprising the following steps:
      placing, by the user, the at least one object to be transported directly on a conveyor;
      reading said identification data, by a first reader, from said first electromagnetic identification tag, and
      storing said identification data read by the first reader in the data memory associated with previously stored user data relating to the at least one object being transported; and
   a conveying phase that conveys the at least one object for the purpose of its transport.

2. A method of preparing and attaching an identification tag to at least one object, the method comprising:
   obtaining, by a user, a first reusable electromagnetic identification tag including identification data that associates the first electromagnetic identification tag with the user;
   a prior phase of storing user data associated with said first electromagnetic identification tag in a data memory by a user, wherein the user is at a location that is remote from the transport place and remote from a location of the data memory, said user data comprising:
      information relating to the user with whom the at least one object is associated;
      information relating to the total number of objects declared by said user; and
      information relating to a destination, a route and a time of the transport of the at least one object;
   applying, by the user, said first electromagnetic identification tag to the at least one object to be transported;
   a depositing phase taking place at the transport place, said depositing phase comprising the following steps:
      measuring at least one of a weight and dimensions of the at least one object and storing, in the data memory, at least one of the weight and the dimensions in association with the user data relating to the transport of the at least one object;
      placing, by the user, the at least one object to be transported directly on a conveyor;

reading said identification data, by a first reader, from said first electromagnetic identification tag, and storing said identification data read by the first reader in the data memory associated with previously stored user data relating to the at least one object being transported; and a conveying phase that conveys the at least one object for the purpose of its transport.

3. The method according to claim 2, further including, before the step of conveying the at least one object for the purpose of its transport, the following steps:

conveying the at least one object to a second reader; and processing the at least one object, performed out of reach of said user, and comprising the following steps:

automatic reading of the identification data from the first electromagnetic identification tag, by said second reader;

reading, on a second electromagnetic identification tag, of at least a part of the user data relating to said transport of the at least one object associated with said read identification data; and placing said second electromagnetic identification tag on the at least one object.

4. The method according to claim 2, wherein in said depositing phase, before the step of automatic reading of the first electromagnetic identification tag by the first reader, an identification of the user depositing the at least one object to be transported.

5. The method according to claim 2, further including:

during the depositing phase, reading or taking biometric data of the user; and during a boarding step:

reading or taking the same biometric data of the user; and comparing the biometric data read during the boarding step with the biometric read during the depositing phase.

6. The method according to claim 2, wherein the first electromagnetic identification tag is an RFID tag.

7. The method according to claim 3, wherein the second electromagnetic identification tag is an RFID tag.

8. The method according to claim 3, wherein the second electromagnetic identification tag is a barcode label.

9. The method according to claim 2, wherein the data memory are accessible by an information system of a company responsible for the transport of the at least one object.

10. The method according to claim 2, wherein the at least one object is at least one luggage item and depositing the at least one luggage item at an airport for the purpose of transporting the at least one luggage item by air.

11. The method according to claim 2, wherein the at least one object is at least one package and depositing the at least one package to be transported at a place.

12. A system for preparing and attaching an identification tag to at least one object, the system comprising:

a first reusable electromagnetic identification tag obtained by a user, the first electromagnetic identification tag including identification data that associates the first electromagnetic identification tag with the user;

first data memory for storing, by a user, user data associated with said first electromagnetic identification tag and relating to the transport of at least one object, said first data memory being in a location that is remote from the transport place and remote from the user;

wherein the first electromagnetic identification tag is attached by the user to the at least one object after storing the user data in the first data memory;

a first reader that reads identification data from the first electromagnetic identification tag on the at least one object to be transported;

a second data memory in communication with said first reader, and provided for storing said identification data in association with previously stored user data relating to said transport of the at least one object;

a conveyor that conveys said the at least one object placed by said user directly on the conveyor, for the purpose of transporting the at least one object, said conveyor being located at the transport place; and a measurement device that measures at least one of a weight and dimensions of the at least one object.

13. The system according to claim 12, further including:

an additional conveyor that conveys the at least one object, from the first reader to the second reader arranged out of reach of the user, wherein the second reader reads the identification data from the first electromagnetic identification tag; and a writing device that writes on a second electromagnetic identification tag, the user data relating to the transport of the at least one object associated with said identification data read by said second reader, said second electromagnetic identification tag being provided and arranged on said at least one object.

14. The system according to claim 12, wherein at least one of the first data memory and the second data memory communicates with a centralized information system of a company responsible for the transport of the at least one object.

15. The system according to claim 12, wherein the first electromagnetic identification tag is a RFID identification tag, the first and second readers comprising RFID antennas configured for reading said RFID identification tag.

16. The system according to claim 15, wherein at least one of the first reader and the second reader comprise at least one antenna arranged on at least one support forming, when idle, a barrier or a curtain with respect to the passage of the at least one object, and which, on contact with the latter, is capable of moving to a retracted position.

17. The system according to claim 12, further comprising:

first biometric reader that reads biometric data of the user;

second biometric reader that reads the same biometric data of the user; and means for comparing the biometric data read by said first biometric reader and said second biometric reader.

18. The system according to claim 12, wherein the at least one object is at least one luggage item and depositing the at least one luggage item at an airport for the purpose of transporting the at least one luggage item by air.

19. The system according to claim 12, wherein the at least one object is at least one package and depositing the at least one package at a post office for the purpose of transporting the at least one package.

* * * * *